United States Patent
Mair et al.

(10) Patent No.: US 9,690,365 B2
(45) Date of Patent: Jun. 27, 2017

(54) DUAL-RAIL POWER EQUALIZER

(71) Applicant: MediaTek Inc., Hsinchu (TW)

(72) Inventors: Hugh Thomas Mair, Fairview, TX (US); Yi-Te Chiu, Kaohsiung (TW); Che-Wei Wu, Taichung (TW); Lee-Kee Yong, Hsinchu (TW); Chia-Wei Wang, Fengyuan (TW); Cheng-Hsing Chien, Hsinchu (TW); Uming Ko, Houston, TX (US)

(73) Assignee: MediaTek, Inc., Hsinchu (TW)

( * ) Notice: Subject to any disclaimer, the term of this patent is extended or adjusted under 35 U.S.C. 154(b) by 0 days.

(21) Appl. No.: 15/138,462

(22) Filed: Apr. 26, 2016

(65) Prior Publication Data

US 2016/0320821 A1 Nov. 3, 2016

Related U.S. Application Data

(60) Provisional application No. 62/154,971, filed on Apr. 30, 2015.

(51) Int. Cl.
*G11C 7/22* (2006.01)
*G06F 1/32* (2006.01)

(52) U.S. Cl.
CPC .......... *G06F 1/3296* (2013.01); *G06F 1/3275* (2013.01)

(58) Field of Classification Search
CPC .................................. G11C 7/22; G11C 5/14
USPC ............................................. 365/226, 189.05
See application file for complete search history.

(56) References Cited

U.S. PATENT DOCUMENTS

| | | | |
|---|---|---|---|
| 6,366,061 B1* | 4/2002 | Carley | G05F 3/262 323/223 |
| 2014/0313819 A1* | 10/2014 | Choi | G11C 5/14 365/156 |
| 2016/0071576 A1* | 3/2016 | Ishii | G11C 11/419 365/154 |

* cited by examiner

*Primary Examiner* — Michael Tran
(74) *Attorney, Agent, or Firm* — The Law Office of Tong Lee

(57) ABSTRACT

A processing device performs dual-rail power equalization for its memory cell array and logic circuitry. The memory cell array is coupled to a first power rail through a first switch to receive a first voltage level. The logic circuitry is coupled to a second power rail through a second switch to receive a second voltage level that is different from the first voltage level. The processing device also includes a power switch coupled to at least the second power rail and operative to be enabled to equalize voltage supplied to the memory cell array and the logic circuitry.

16 Claims, 4 Drawing Sheets

DUAL-RAIL POWER EQUALIZER

CROSS-REFERENCE TO RELATED APPLICATIONS

This application claims the benefit of U.S. Provisional Application No. 62/154,971 filed on Apr. 30, 2015.

TECHNICAL FIELD

Embodiments of the invention relate to power management in a processor.

BACKGROUND

A modern processor includes both logic circuitry and memory cell arrays. During operation, the voltage supplied to the processor may be dynamically adapted to its workload requirements. For example, a processor may operate according to Dynamic Voltage Frequency Scaling (DVFS) to achieve significant power savings. However, memory cell arrays are much more sensitive to voltage changes than logic gates. As the transistor threshold voltage variation increases, the memory cell arrays begin to suffer more failures.

A dual power rail architecture separates the memory cell voltage from the logic voltage. This separation allows the memory cells to have a stable voltage within a safe voltage range for nominal static noise margin. The logic voltage may be significantly lowered for dynamic power savings. When dual power rails are implemented, the processor designer has the ability to reduce the power supply significantly in the logic gates while maintaining a safe voltage supply for the memory cell arrays.

To ensure the proper operation of the memory cell array, an operating requirement is that the voltage ($V_{mem}$) of the memory cell array should not be lower than the voltage of the logic circuitry ($V_{logic}$). In other words, the operating requirement is: $V_{mem} \geq V_{logic}$. At high voltage operations, $V_{logic}$ may experience non-negligible ripples, making it difficult to meet the operating requirement.

SUMMARY

In one embodiment, a processing device is provided for dual-rail power equalization. The processing device includes a memory cell array and logic circuitry. The memory cell array is coupled to a first power rail through a first switch to receive a first voltage level. The logic circuitry is coupled to a second power rail through a second switch to receive a second voltage level that is different from the first voltage level. The processing device also includes a power switch coupled to at least the second power rail and operative to be enabled to equalize voltage supplied to the memory cell array and the logic circuitry.

In another embodiment, a method is provided for dual-rail power equalization in a computing system that includes a memory cell array and logic circuitry. The method comprises disabling a power switch for the memory cell array to receive a first voltage level supplied by a first power rail and for logic circuitry to receive a second voltage level supplied by a second power rail, wherein the first voltage level is different from the second voltage level. The method further comprises enabling the power switch to equalize voltage supplied to the memory cell array and the logic circuitry.

BRIEF DESCRIPTION OF THE DRAWINGS

The invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
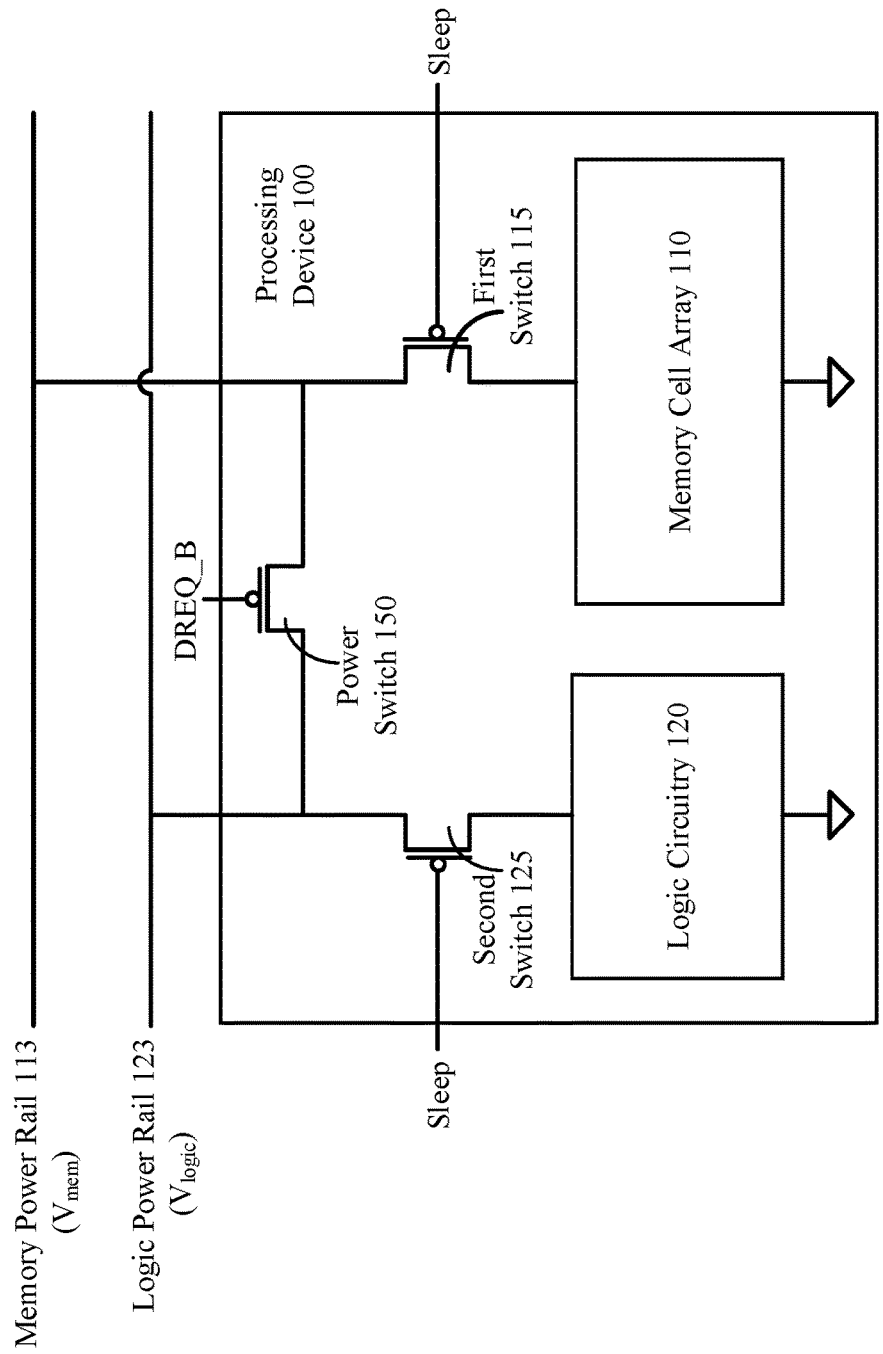
FIG. 1 illustrates a diagram of a processing device containing a dual-rail power equalizer according to a first embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for equalizing the voltages received by a memory cell array and logic circuitry in a processing device that includes dual power rails. Examples of the processing device include, but are not limited to, a central processing unit (CPU), a core, a graphics processing unit (GPU), a digital processing processor (DSP), etc. In one embodiment, the processing device may be part of a mobile computing and/or communication device (e.g., a smartphone, a tablet, laptop, etc.). In another embodiment, the processing device may be part of a cloud computing system. An example of the memory cell array is a cache memory, such as a synchronous RAM (SRAM) or other volatile or non-volatile on-processor memory. The logic circuitry may be the logic gates in an Arithmetic Logic Unit (ALU), in the peripheral controller or I/O controller of a memory cell array, or in other parts of a processing device.

Typically, the voltage of logic circuitry ($V_{logic}$) fluctuates especially at high voltage level, while the voltage of memory cell arrays ($V_{mem}$) stays at a constant or near constant level. To satisfy the operating requirement of $V_{mem} \geq V_{logic}$, the processing device may selectively operate in a dual-rail mode or a single-rail mode. In one embodiment, when the operating voltage level of $V_{logic}$ is greater than or equal to a predetermined threshold, the processing device operates the memory cell array and the logic circuitry in a single-rail mode. When $V_{logic}$ is less than a predetermined threshold, the processing device operates the memory cell array and the logic circuitry in a dual-rail mode. In the dual-rail mode, the memory cell array receives $V_{mem}$ (also referred to as the memory cell voltage or the first voltage) from a first power rail (i.e., memory power rail), and the logic circuitry receives $V_{logic}$ (also referred to as the logic voltage or the second voltage) from a second power rail (i.e., logic power rail). In the single-rail mode, both the memory cell array and the logic circuitry receives the same voltage. Typically, the logic power rail is capable of supplying power at a much higher level than the memory power rail. Thus, in one embodiment (such as the second embodiment shown in FIG. 2), the same voltage in the single-rail mode is $V_{logic}$ supplied from the logic power rail.

Figure 2:
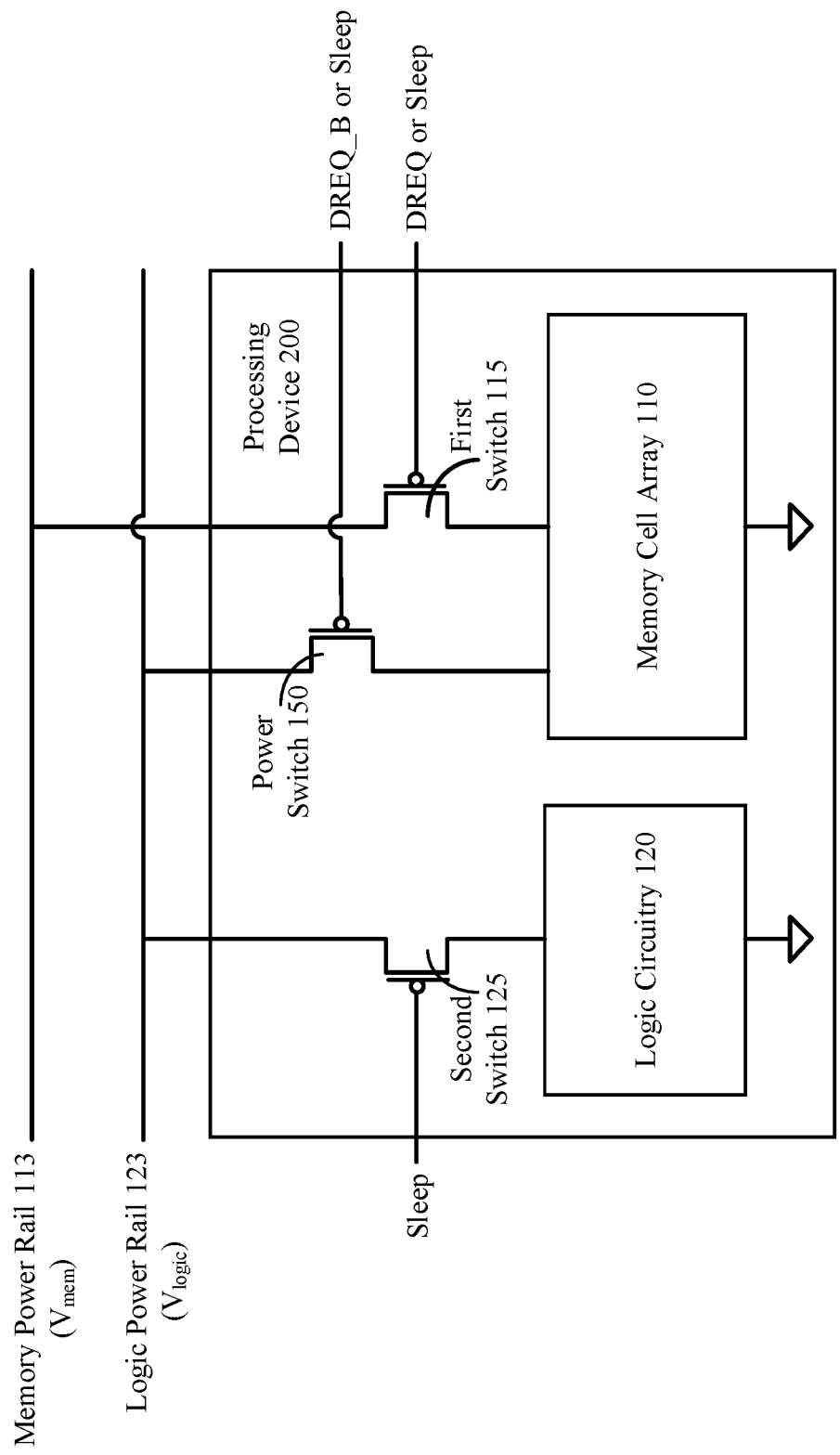
FIG. 2 illustrates a diagram of a processing device containing a dual-rail power equalizer according to a second embodiment.

FIG. 1 and FIG. 2 illustrate how the selective switching between the dual-rail mode and single-rail mode may be achieved with a power switch.

FIG. 1 illustrates a processing device 100 including a memory cell array 110 and logic circuitry 120 according to a first embodiment. The memory cell array 110 is connected to a memory power rail 113 via a first switch 115, and the logic circuitry 120 is connected to a logic power rail 123 via a second switch 125. Both the first switch 115 and the second switch 125 may be semiconductor-based switches, such as metal-oxide-semiconductor field-effect transistors (MOSFET), field-effect transistors (FET), or other types of switches. In the embodiment shown in FIG. 1, both the first switch 115 and the second switch 125 are P-channel FET (PFET) switches, with their source terminals connected to the respective power rails. The processing device 100 also includes a power switch 150, which may also be a PFET switch or another type of switch. In this embodiment, the power switch 150 connects the source terminals of the first switch 115 and the second switch 125. That is, the power switch 150 connects the logic power rail 123 to the memory power rail 113 via the power switch 150. When the power switch 150 is turned on, it equalizes the voltage received by the memory cell array 110 and the logic circuitry 120.

In one embodiment, the power switch 150 is a PFET switch controlled by a signal DREQ_B, which is the inverse of DREQ. The power switch 150 is turned on when DREQ is enabled (i.e., DREQ_B becomes low). That is, the processing device 100 operates in the single-rail mode when DREQ is enabled. On the other hand, the power switch 150 is turned off when DREQ is disabled (i.e., DREQ_B becomes high). That is, the processing device 100 operates in the dual-rail mode when DREQ is enabled.

In one embodiment, the first switch 115 and the second switch 125 are also connected to a sleep signal and/or power down signal. For simplicity of the explanation, the term "sleep signal" is used hereinafter to represent any control signal that cuts off the power supply to the memory cell array 110 and the logic circuitry 210. When the sleep signal is enabled, the first switch 115 and the second switch 125 are both turned off. In addition, DREQ is disabled to turn off the power switch 150. When the sleep signal is disabled, the first switch 115 and the second switch 125 are both turned on, and DREQ controls the on/off of the power switch 150. Table I below lists different combinations of sleep signal and DREQ, as well as the resulting voltage(s) received by the memory cell array 110 and the logic circuitry 210. In Table I, $V_{eq}=V_{logic}$.

TABLE I

First Embodiment

| Sleep | DREQ | Logic Circuitry | Memory Cell Array |
|---|---|---|---|
| Disable | Enable | $V_{eq}$ | $V_{eq}$ |
| Disable | Disable | $V_{logic}$ | $V_{mem}$ |
| Enable | Disable | Off | Off |

FIG. 2 illustrates a processing device 200 that also includes the memory cell array 110 and the logic circuitry 120 according to a second embodiment. Similar to the first embodiment of FIG. 1, the memory cell array 110 is connected to the memory power rail 113 via the first switch 115, and the logic circuitry 120 is connected to the logic power rail 123 via the second switch 125. In contrast to the first embodiment, the memory cell array 110 in the second embodiment is also connected to the logic power rail 123 via the power switch 150. When the sleep signal is disabled, the power switch 150 and the first switch 115 are controlled by complementary signals; e.g., DREQ_B and DREQ, respectively. In an embodiment, the first switch 115, the second switch 125 and the power switch 150 are P-type switches such as PFETs. Thus, when DREQ is enabled (i.e., DREQ goes high and DREQ_B goes low), the power switch 150 is turned on and the first switch 115 is turned off, resulting in the memory cell array 110 connected to the logic power rail 123. That is, when DREQ is enabled, both the memory cell array 110 and the logic circuitry 120 receive the same voltage from the logic power rail 123, and the processing device 200 operates in the single-rail mode. When DREQ is disabled (i.e., DREQ goes low and DREQ_B goes high), the power switch 150 is turned off and the first switch 115 is turned on, resulting in the memory cell array 110 connected to the memory power rail 113. That is, the processing device 100 operates in the dual-rail mode when DREQ is disabled.

In one embodiment, the first switch 115, the second switch 125 and the power switch 150 are also connected to a sleep signal. When the sleep signal is enabled, all of the three switches (the first switch 115, the second switch 125 and the power switch 150) are turned off. Table II below lists different combinations of sleep signal and DREQ, as well as the resulting voltage(s) received by the memory cell array 110 and the logic circuitry 210.

TABLE II

Second Embodiment

| Sleep | DREQ | Logic Circuitry | Memory Cell Array |
|---|---|---|---|
| Disable | Enable | $V_{logic}$ | $V_{logic}$ |
| Disable | Disable | $V_{logic}$ | $V_{mem}$ |
| Enable | N/A | Off | Off |

In an alternative embodiment, the sleep signal and the DREQ values may be stored in registers. The processing device 100 or 200 may read the register values and set the switches accordingly.

Figure 3:
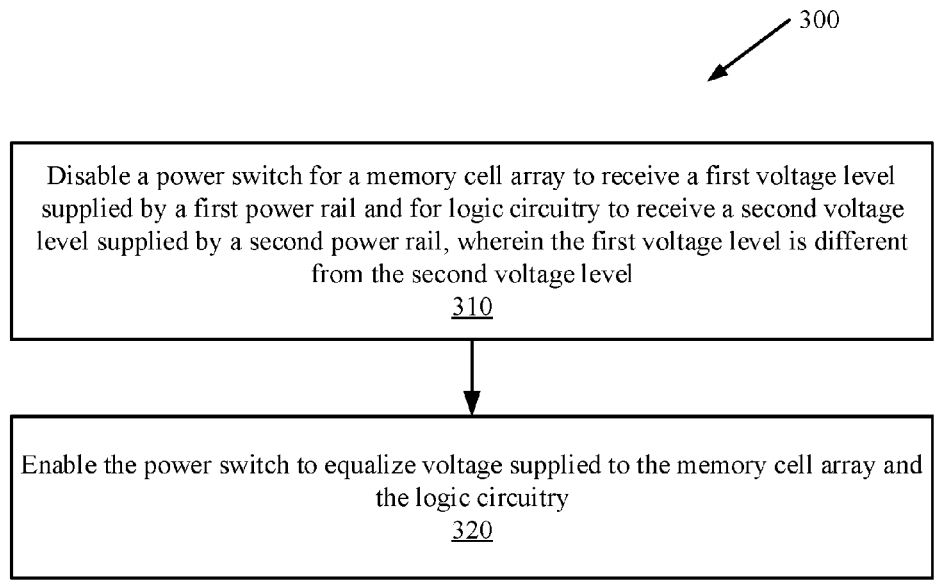
FIG. 3 is a flow diagram illustrating a method for a dual-rail power equalizer according to one embodiment.

FIG. 3 is a flow diagram illustrating a method 300 for dual-rail power equalization according to one embodiment. The dual-rail power equalization can be achieved by controlling a power switch, such as the power switch 150 of FIG. 1 or FIG. 2. The power switch may be disabled for a memory cell array to receive a first voltage level supplied by a first power rail and for logic circuitry to receive a second voltage level supplied by a second power rail (step 310). The first voltage level is different from the second voltage level; e.g., the first voltage level may be $V_{mem}$ and the second voltage level may be $V_{logic}$, as described in connection with FIGS. 1 and 2. The power switch can be enabled to equalize voltage supplied to the memory cell array and the logic circuitry (step 320). The steps 310 and 320 may be performed in any order.

In one embodiment, the method 300 may be performed by a power control unit that generates the control signals such as DREQ or DREQ_B, or updates the register that stores DREQ or DREQ_B. The power control unit may be inside or outside the processing device 100 or 200. In one embodiment, the power control unit may enable or disable the DREQ or DREQ_B based on whether the present operating voltage level of $V_{logic}$ exceeds a predetermined threshold voltage.

Figure 4A:
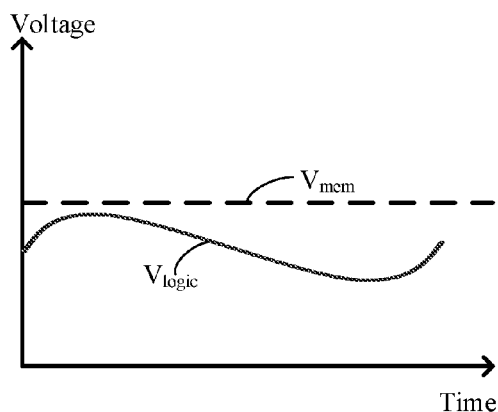
FIG. 4A is a diagram of memory cell voltage and logic voltage in a dual-rail mode according to one embodiment.
Figure 4B:
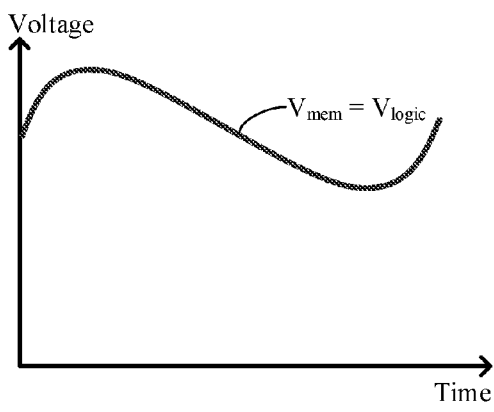
FIG. 4B is a diagram of memory cell voltage and logic voltage in a single-rail mode according to one embodiment

FIG. 4A is a diagram illustrating voltage levels for dual-rail mode according to one embodiment. The flat dotted line represents $V_{mem}$ and the curved line represents $V_{logic}$. In this diagram, $V_{logic}$ operates in a low voltage region (below a predetermined threshold voltage). Even though $V_{logic}$ fluctuates, it stays below $V_{mem}$ as required by the operating requirement of $V_{mem} \geq V_{logic}$. FIG. 4B is a diagram illustrating voltage levels for single-rail mode according to one embodiment. In this diagram, $V_{logic}$ operates in a high voltage region (above a predetermined threshold voltage). To satisfy the operating requirement, voltage levels of $V_{mem}$ and $V_{logic}$ are equalized; that is, the difference between $V_{mem}$ and $V_{logic}$ is zero or near zero. The fluctuation in the equalized voltage generally remains within a tolerance and does not cause any problem. In the single-rail mode shown herein, the switches are configured to source power from $V_{logic}$. This is because the $V_{logic}$ level is typically much higher in the dual-rail mode, and, therefore, the power supply on $V_{logic}$ is more capable of handling the additional load.

Figure 5:
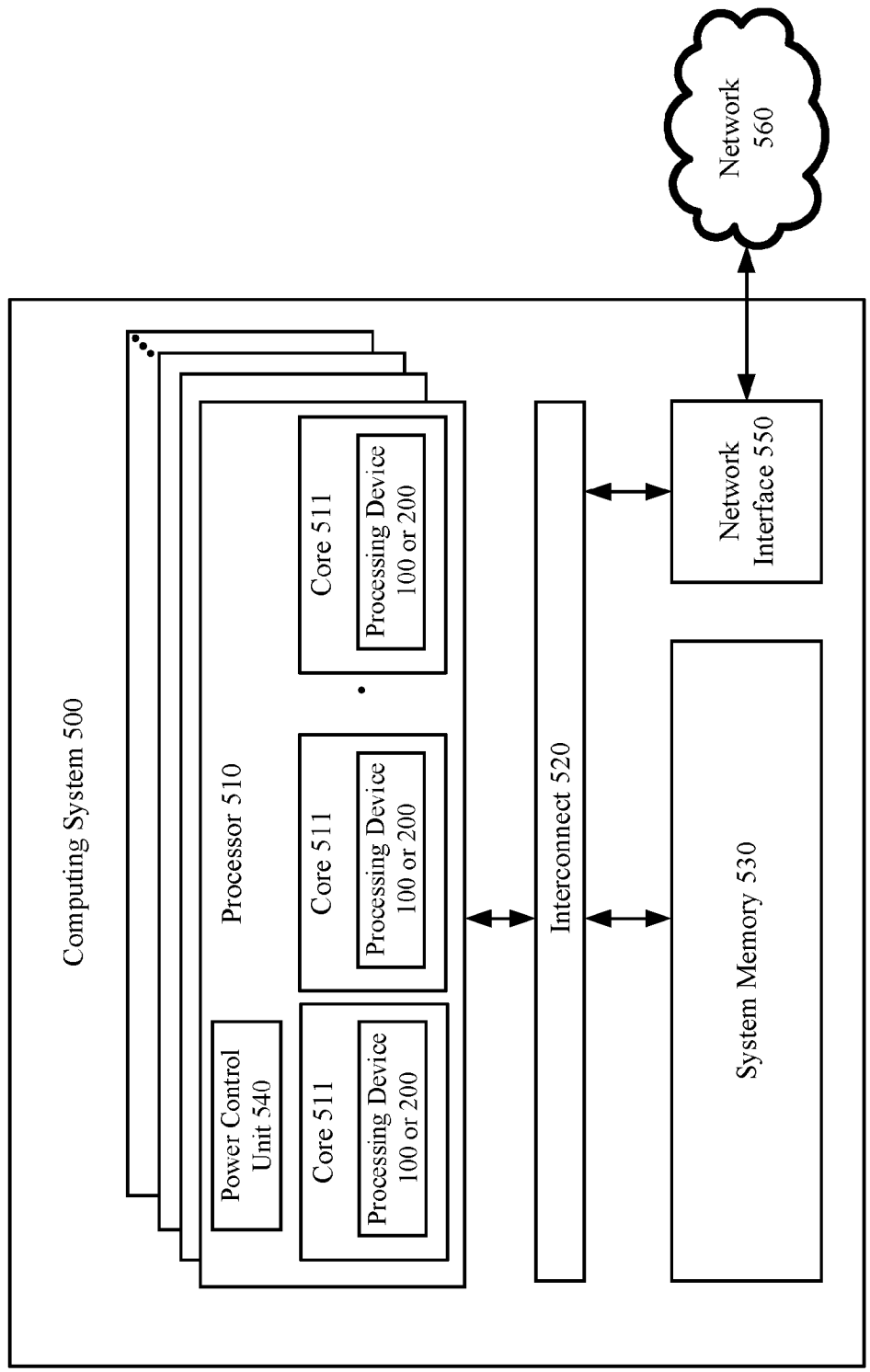
FIG. 5 is a block diagram illustrating a computing system according to one embodiment.

FIG. 5 is a block diagram illustrating a computing system 500 according to one embodiment. The computing system 500 includes one or more processors 510 (also referred to as central processing units (CPUs)), and each processor includes one or more cores 511. The computing system 500 may be part of a mobile device or a host computer. The processors 510 may form one or more clusters. In one embodiment, each core 511 includes a processing device 100 of FIG. 1 or the processing device 200 of FIG. 2. The processing device 100 or 200 may be the core 511 itself, a cache memory (including memory cell arrays and associated control logic circuitry) within the core 511, or other logic and memory components.

The processors 510 may access a system memory 530 (e.g., dynamic random-access memory (DRAM)) via an interconnect 520. The computing system 500 further includes a network interface 550 for accessing a network 560. The computing system 500 may also include peripheral devices such as a display, a camera, a modem, etc., and/or other devices not shown in FIG. 5.

In one embodiment, the computing system 500 also includes a power control unit 540 to detect the operating voltage of $V_{logic}$ and control the switching between the dual-rail mode and single-rail mode. The power control unit 540 may, alternatively, be inside each core 511, outside the cores 511 but within each processor 510, or elsewhere in the computing system 500. In another embodiment, the computing system 500 may also include one or more GPUs, DSPs or other types of processors, which include a processing device 100 of FIG. 1 or the processing device 200 of FIG. 2 to perform the dual-rail power equalizer operations as described in FIG. 3. The processing device 100 or 200 performs the dual-rail power equalization as described in FIG. 3 according to the directions of the power control unit 540.

The operations of the flow diagram of FIG. 3 have been described with reference to the exemplary embodiments of FIGS. 1, 2 and 5. However, it should be understood that the operations of the flow diagram of FIG. 3 can be performed by embodiments of the invention other than those discussed with reference to FIGS. 1, 2 and 5, and the embodiments discussed with reference to FIGS. 1, 2 and 5 can perform operations different than those discussed with reference to the flow diagram. While the flow diagram of FIG. 3 shows a particular order of operations performed by certain embodiments of the invention, it should be understood that such order is exemplary (e.g., alternative embodiments may perform the operations in a different order, combine certain operations, overlap certain operations, etc.).

To sum up, the invention discloses a processing device comprising a memory cell array, logic circuitry and a power switch. The memory cell array couples to a first power rail through a first switch to receive a first voltage level. The logic circuitry couples to a second power rail through a second switch to receive a second voltage level that is different from the first voltage level. The power switch couples to at least the second power rail and operative to be enabled to equalize voltage supplied to the memory cell array and the logic circuitry.

The invention further discloses a method of controlling a power switch in a processing device that includes a memory cell array and logic circuitry, comprising: disabling the power switch for the memory cell array to receive a first voltage level supplied by a first power rail and for the logic circuitry to receive a second voltage level supplied by a second power rail, wherein the first voltage level is different from the second voltage level; and enabling the power switch to equalize voltage supplied to the memory cell array and the logic circuitry.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A processing device comprising:
    a memory cell array coupled to a first power rail through a first switch to receive a first voltage level;
    logic circuitry coupled to a second power rail through a second switch to receive a second voltage level that is different from the first voltage level;
    a power switch coupled to at least the second power rail and operative to be enabled to equalize voltage supplied to the memory cell array and the logic circuitry, wherein the power switch has a first end coupled to the memory cell array and a second end coupled to the second power rail, and is operative to be enabled to supply the second voltage level to both the memory cell array and the logic circuitry.

2. The processing device of claim 1, wherein when the power switch is disabled, the first switch is operative to be enabled to supply the first voltage level to the memory cell array.

3. The processing device of claim 1, wherein the power switch is operative to be turned on and off according to a value stored in a designated register.

4. A processing device comprising:
   a memory cell array coupled to a first power rail through a first switch to receive a first voltage level;
   logic circuitry coupled to a second power rail through a second switch to receive a second voltage level that is different from the first voltage level;
   a power switch coupled to at least the second power rail and operative to be enabled to equalize voltage supplied to the memory cell array and the logic circuitry, wherein the memory cell array and the logic circuitry operate at two different voltage levels with the power switch disabled when the second voltage level is below a threshold.

5. The processing device of claim 4, wherein when the second voltage level exceeds the threshold, the memory cell array and the logic unit operate at the equalized voltage level with the power switch enabled.

6. The processing device of claim 4, wherein the power switch is operative to be turned on and off according to a value stored in a designated register.

7. A processing device comprising:
   a memory cell array coupled to a first power rail through a first switch to receive a first voltage level;
   logic circuitry coupled to a second power rail through a second switch to receive a second voltage level that is different from the first voltage level;
   a power switch coupled to at least the second power rail and operative to be enabled to equalize voltage supplied to the memory cell array and the logic circuitry, wherein the power switch is a P-type Field-Effect Transistor (FET).

8. The processing device of claim 7, wherein the power switch is operative to be turned on and off according to a value stored in a designated register.

9. The processing device of claim 7, wherein the power switch has a first end coupled to the memory cell array and a second end coupled to the second power rail, and is operative to be enabled to supply the second voltage level to both the memory cell array and the logic circuitry.

10. The processing device of claim 9, wherein when the power switch is disabled, the first switch is operative to be enabled to supply the first voltage level to the memory cell array.

11. The processing device of claim 7, wherein the memory cell array and the logic circuitry operate at two different voltage levels with the power switch disabled when the second voltage level is below a threshold.

12. The processing device of claim 11, wherein when the second voltage level exceeds the threshold, the memory cell array and the logic unit operate at the equalized voltage level with the power switch enabled.

13. A method of a processing device that includes a memory cell array and logic circuitry, comprising:
   disabling a power switch for the memory cell array to receive a first voltage level supplied by a first power rail and for the logic circuitry to receive a second voltage level supplied by a second power rail, wherein the first voltage level is different from the second voltage level;
   enabling the power switch to equalize voltage supplied to the memory cell array and the logic circuitry; and
   disabling the power switch when the second voltage level is below a threshold.

14. The method of claim 13, further comprising:
   enabling the power switch when the second voltage level exceeds a threshold.

15. The method of claim 13, wherein the power switch has a first end coupled to the memory cell array and a second end coupled to the second power rail, and wherein enabling the power switch further comprises: supplying the second voltage level to both the memory cell array and the logic circuitry.

16. The method of claim 13, further comprising: generating a value in a designated register to enable or disable the power switch.

* * * * *